United States Patent [19]

Stoll et al.

[11] Patent Number: 5,514,961

[45] Date of Patent: May 7, 1996

[54] POSITION DETECTING DEVICE FOR A LINEAR DRIVE INCLUDING TWO MAGNETS HAVING LIKE POLES DISPOSED FACING EACH OTHER FOR CONCENTRATING THE FLUX AT ONE POINT

[75] Inventors: Kurt Stoll, Esslingen; Johannes Volzer, Heroldstatt; Christoph Hanisch, Esslingen, all of Germany

[73] Assignee: Festo KG, Esslingen, Germany

[21] Appl. No.: 312,292

[22] Filed: Sep. 26, 1994

[30] Foreign Application Priority Data

Oct. 13, 1993 [DE] Germany ................... 43 34 811.4

[51] Int. Cl.$^6$ ................... G01B 7/30; G01B 7/14
[52] U.S. Cl. ................... 324/207.13; 324/207.24
[58] Field of Search ................... 324/207.24, 207.13, 324/207.26, 207.22, 207.23, 262; 73/597, 632, 779

[56] References Cited

U.S. PATENT DOCUMENTS

| | | | |
|---|---|---|---|
| 4,071,818 | 1/1978 | Krisst | 324/207.13 |
| 4,344,068 | 8/1982 | Thompson et al. | 324/207.13 |
| 5,198,761 | 3/1993 | Hashimoto et al. | 324/207.13 |
| 5,264,792 | 11/1993 | Luetzow et al. | 324/174 |
| 5,313,160 | 5/1994 | Gloden et al. | 324/207.13 |
| 5,320,325 | 6/1994 | Young et al. | 324/207.13 |

FOREIGN PATENT DOCUMENTS 3238415 4/1988 Japan ................... 324/207.24

Primary Examiner—Sandra L. O'Shea
Assistant Examiner—Roger Phillips
Attorney, Agent, or Firm—Hoffmann & Baron

[57] ABSTRACT

An ultrasonic position detecting device on a linear drive. The drive element of the linear drive bears a magnet arrangement cooperating with an adjacently placed sensor device which comprises an acoustic wave guide of magnetostrictive material. The magnet arrangement possesses an axially magnetized, annular or disk-like magnet part and, adjacent to the same, a pole part. By selection of the design of the pole part it is possible to affect the course of the magnetic field of the magnet part in order to achieve an optimum state for the sensor device.

20 Claims, 1 Drawing Sheet

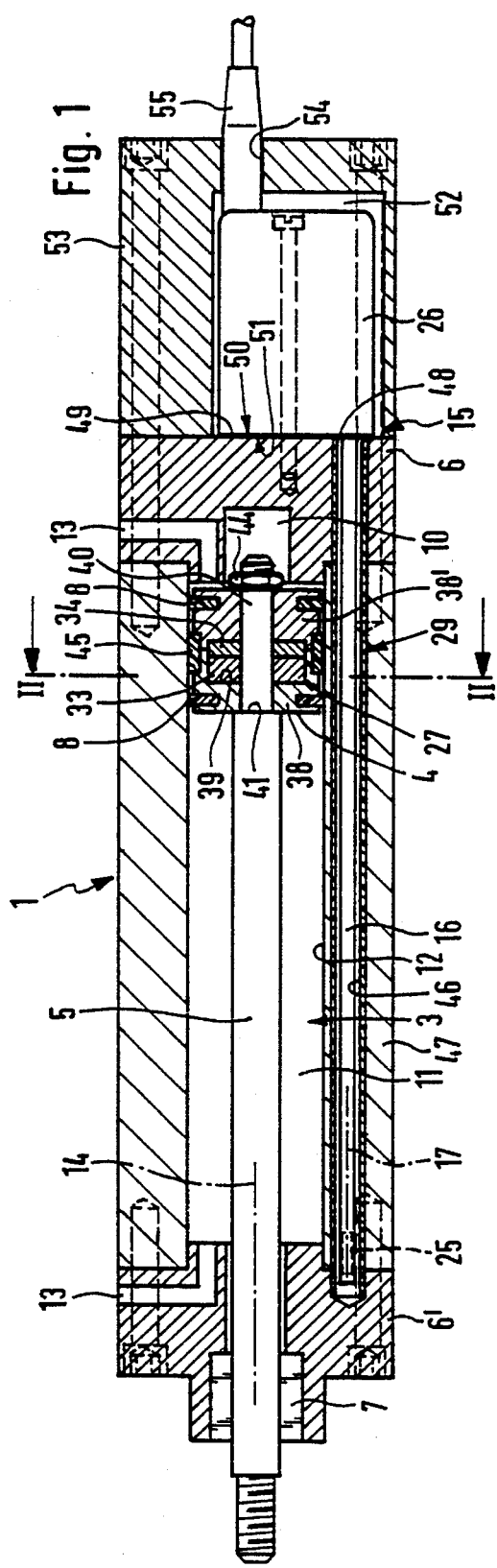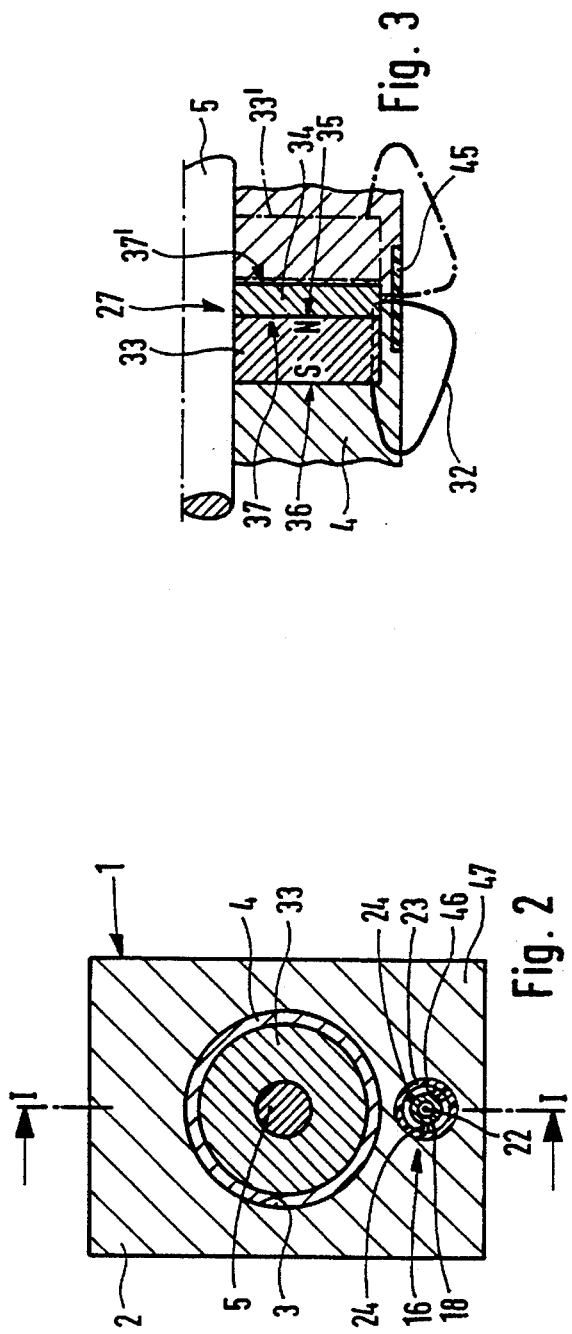

POSITION DETECTING DEVICE FOR A LINEAR DRIVE INCLUDING TWO MAGNETS HAVING LIKE POLES DISPOSED FACING EACH OTHER FOR CONCENTRATING THE FLUX AT ONE POINT

BACKGROUND OF THE INVENTION

The invention relates to an ultrasonic position detecting device on a linear drive, for the detection of the axial position of a movably arranged drive element in the housing of a linear drive, comprising a sensor device arranged fixedly in relation to the housing in the radially peripheral part of the drive element, said sensor device having an acoustic wave guide extending in the longitudinal direction of the housing and made of a material suitable for magnetostriction and adapted to communicate with an evaluating device, and a magnet arrangement having a permanent magnet, arranged within the housing, and so connected with the drive element that its magnetic field may affect the part, which is at a given time radially adjacent, of the acoustic wave guide.

Ultrasonic position detection devices are disclosed in the prior art and their principle of operation is for example described in the U.S. Pat. No. 3,898,555. In the working embodiment of this patent the measuring system comprises a wire arranged coaxially in a tube, the so-called acoustic wave guide, and consists of a magnetostrictive material. The part, whose position is to be detected, is connected with a permanent magnet, which can run along the acoustic wire guide. A short current pulse caused to flow along the wire guide produces a traveling magnetic field, which is locally modified by the magnetic field of the permanent magnet so that the acoustic wave guide is subject to a mechanical strain. Accordingly a torsion wave is created in the acoustic wave guide, which is propagated at the speed of light and at the end of the acoustic wave guide is converted into electrical pulses. The time between the occurrence of such electrical pulse and the initial current pulse renders possible the determination of positions.

A linear drive fitted with such a position detection device is disclosed in the European patent publication 0 498 918 A1. The linear drive is a fluid power cylinder, whose drive element constituted by the piston bears a permanently magnetic magnet arrangement, which is constituted by two spaced rod magnets or by a horseshoe magnet. The arrangement is such that the mutually spaced pole surfaces or areas are radially aligned and the emerging field lines are directed right toward the acoustic wave guide.

The design of the known magnet arrangement involves considerable complexity. It is only when the magnetic field meeting with the acoustic wave guide complies with certain criteria as regards density and configuration that reliable measurement is possible with negligible errors. Therefore in the case of different conditions of use—for example in the case of employment on fluid power cylinders—permanent magnet parts have to be selected and arranged on a case to case basis.

SHORT SUMMARY OF THE INVENTION

One object of the invention is to provide a position detection device for use on a linear drive of the sort noted initially, which while having a simple and cost-effective design of the magnet arrangement leads to reliable determination of position.

In order to achieve these and/or other objects appearing from the present specification, claims and drawings, in the present invention a permanent magnet of the magnet arrangement is designed in the form of an axially magnetized, annular or disk-like magnet part, which is so connected with the drive element that its two pole surfaces are axially directed and the magnet arrangement furthermore comprises an annular or disk-like pole part arranged adjacent to one of the pole surfaces of the magnet part.

It is in this manner that using a single permanent magnet part the user of the equipment may create a magnetic field whose field alignment leads to reliable actuation, in a manner able to be exactly evaluated, of the sensor device. As a magnet part a standardized component can be employed, which may be utilized under different application conditions. The special adaptation to suit the respective purpose of use is by means of the axial preceding pole part, which is relatively low in price, since it may for instance be a question of a simple ferromagnetic component in the form of a steel disk or steel ring. The magnetic field lines emerging from and entering the pole surface which faces the pole part, of the annular or disk-like magnet part, axially experience a deflection in the pole part, in which respect owing to the design of the pole part the proportion of the field lines reaching the sensor device may be varied, for example in direction and density, by the configuration of the pole part. There is no difficulty in attaining a desired steep field strength gradient.

Further advantageous forms of the invention are recited in the claims.

Although the magnet arrangement is not in principle subject to any limitations as regards the number of the magnet parts and of the pole parts, besides a magnet arrangement, which merely comprises one single magnet part and a single pole part, such a magnet arrangement is looked upon as being advantageous, which has a single pole part and two magnet parts, the pole part being straddled at axially opposite ends respectively by one of the axially magnetized annular or disk-like permanent magnet parts. The alignment is preferably such in this case that pole surfaces of the same sign are opposite to each other. It is in this manner that the magnetic flux of both magnet parts in the pole part is deflected radially outward in a concentrated fashion.

As has been discovered, a magnet arrangement with a pole part supplies a signal for evaluation which is substantially less affected by variations in distance between the magnet arrangement and the acoustic wave guide than it is case with a magnet arrangement without any pole disk.

In the case of one advantageous design in accordance with the invention the sensor device comprising the acoustic wave guide and which extends longitudinally beside the housing space accommodating the drive element, is arranged in a channel-like receiving space, which is integrated in the housing wall of the linear drive. This means that when fitting the sensor device during assembly the exact desired distance of the drive part from the magnet arrangement is automatically kept to. Fitting and alignment is consequently substantially easier than in the case of an arrangement, in which the sensor device is arranged on the outer side of the cylinder housing. Furthermore it is possible to get quite close in a radial direction to the housing space accommodating the drive element so that the use of mechanically less robust and hence more cost-effective magnet parts becomes possible. This design is moreover not only advantageous when it comes to manufacturing the magnet arrangement in accordance with the invention but also can be utilized in connection with magnet arrangements in any other fashion, as for example those disclosed in the European patent publication 0 498 918 A1.

Further advantageous developments and convenient forms of the invention will be understood from the following detailed descriptive disclosure of one embodiment thereof in conjunction with the accompanying drawings.

LIST OF THE SEVERAL VIEWS OF THE FIGURES

FIG. 1 shows a linear drive fitted with a first design of the position detecting device of the invention as seen in a longitudinal section taken on the line I—I of FIG. 2.

FIG. 2 shows a cross section taken through the linear drive of FIG. 1 taken on the section line II—II.

FIG. 3 shows a part of the linear drive in accordance with FIG. 1 on a larger scale adjacent to the magnet arrangement, the optional use of a second magnet drive being indicated in chained lines.

DETAILED ACCOUNT OF WORKING EMBODIMENT OF THE INVENTION

The illustrated linear drive 1 is a fluid power and more especially pneumatic power drive cylinder. It possesses a housing 2, wherein an elongated housing space 3 is formed, which receives a drive element 4 constituted in the present case by an axially running piston. On the drive element 4 in the present working example of the invention a rod-like transmission element 5 is fixedly mounted, which is constituted by a piston rod, such element extending coaxially through the housing space 3 and running through at least one (6') of the two terminal walls 6 and 6' of the housing 2 in an outward direction. In the corresponding opening in the terminal wall 6' a guide and/or sealing arrangement 7 is arranged in a known fashion for the transmission element 5.

On the drive element 4 a sealing arrangement 8 is provided, which cooperates with the radially aligned internal peripheral surface 12 of the housing space 3 in a sealing fashion. It is in this manner that the housing space 3 is axially subdivided into two working spaces 10 and 11 placed one every side of the drive element 4, such working spaces being in communication with the driving fluid ducts 13 provided in the housing 2 In order, by dint of the supply or, respectively, letting off of driving fluid, to cause the desired motion of the drive element 4 along the longitudinal axis 14 of the housing space 3.

The linear drive 1 may in principle be designed without any piston rod, other transmission elements then being provided in order to produce a kinematic coupling between the drive element 4 and a load or power drive means arranged outside the housing space 3.

Preferably in cross section the housing 2 of the linear drive 1 has a rectangular outline as shown in FIG. 2. The internal form of the housing space 3 and accordingly the external from of the drive element 4 is inherently not tied to any particular design configuration the may for example be oval, but it is preferably, as illustrated, circular.

The linear drive 1 is provided with a position detecting device generally referenced 15. This renders possible a detection of the current axial position of the drive element 4 in order in this manner to cause, for example, a follow up control operation of further means. By the intermediary of the position detecting device 15 it is possible at any time to ascertain the current position of the drive element 4 in relation to the housing 2. This possibility of detection is ensure by the particular design of the position detecting device, which practically represents an ultrasonic displacement measurement system. Such displacement measurement systems have long been utilized in accordance with prior art and a detailed description is for example provided in the U.S. Pat. No. 3,898,555. Apart from the arrangement and design of the magnet arrangement still to be explained and serving for position sensing, the position detecting device in accordance with the invention 15 may also have the same structure as that disclosed in the said U.S. Pat. No. 3,898,555. A detailed description is therefore unnecessary here and the following account may be limited to essentials.

The position detecting device 15 considered for the present example is fitted with a generally rod-like sensor device 16, which is secured to the housing 2 in a part radially outside the housing space 3. It is so aligned that its longitudinal axis 17 extends in parallelism to the longitudinal axis 14 of the housing space 3. It extends along the entire stroke length of the drive element 4 and hence preferably at least along entire length of the housing space 3, which it straddles radially externally. As shown in FIG. 2, the sensor device 16 comprises a tubular part, the so-called acoustic wave guide 18, which consists of magnetostrictive material. It is consequently a question of a material, which under the influence of a magnetic field undergoes a modification, as for example a change in cross section and length, and is more particularly ferromagnetic. Its longitudinal axis coincides with the longitudinal axis 17. Concentrically within the tubular acoustic wave guide 18 there extends an electrical conductor 22 constituted for instance by a wire. Radially outside the acoustic wave guide 18 there is preferably furthermore a tubular protective housing 23 which is non magnetic and preferably consists of plastic material. It protects the unit consisting of the acoustic wave guide 18 and the electrically conductor against damage. The radial clearance between the acoustic wave guide 18 and the protective housing 23 concentrically surrounding it may be bridged over by means of transverse ribs 24, which are responsible for an exact centering in the protective housing 23.

At the one transfusion or end part of the sensor device 16 an attenuation element 25 is provided, marked in broken lines. The opposite axial end of the sensor device 16 is connected with an evaluating device 26.

The position detecting device 15 furthermore includes a magnet arrangement 27 located in the housing space 3 and connected with the drive element 4 for movement therewith and is more particularly mounted directly on the drive element. It serves as an indicator of the sensor device 16 and together with current pulse supplies the magnetic field responsible for the Wiedemann effect, of which in FIG. 3 one field line 32 is diagrammatically indicated. The magnetic field of the magnet arrangement 27 extends radially outward and on so doing pervades the acoustic wave guide 18. The position of this pervaded part 29 is subject to axial displacement in accordance with the axial change in position of the drive element 4.

During operation a current pulse from the evaluating device 26 goes through the electrical conductor 22. It produces a circular magnetic field moving substantially with the speed of light, said field also extending in the acoustic wave guide 18. When the magnetic field reaches the above mentioned pervaded part 29, the simultaneous effect or co-pervasion of the circular magnetic field of the current and of the field of the permanently magnetic magnet arrangement 27 in the pervaded part are responsible for the mechanical strain or deformation in the acoustic wave guide 18 owing to magnetostriction. This effect is the Wiedemann effect. As a result a torsion wave is caused on the acoustic wave guide which is propagated along the acoustic wave guide at the speed of sound, that is to say starting from the pervaded part 29 in either axial direction. The one torsion wave is attenuated along the attenuation element 25 down to a reasonable level (the echo signal is reduced). The other wave moves the toward the evaluating device 26 and at the end of the acoustic wave guide 18 is converted in a transducer, as for example as described in the said U.S. Pat. No. 3,898,555, into a current pulse. On the basis of a measurement, performed in the evaluating device 26, of the time elapsing between the start of the input current pulse and the arrival of the resulting output current pulse, it is possible to ascertain the position of the magnet arrangement 27 and accordingly that of the drive element 4 and any load connected with the transmission element 5 and which is to be moved.

The magnet arrangement 27 present in the working embodiment and which is preferred comprises a single permanently magnetic annular magnet part 33 and furthermore a single annular pole part 34, which consists of ferromagnetic material and is arranged at one axial end of the magnet part 33. The annular magnet part 33 is axially magnetized so that two pole surfaces 35 and 36 of opposite polarity are formed. The pole surfaces 35 and 36 therefore extend respectively in a plane at a right angle to the longitudinal axis 14. The pole part 34 is coaxially arranged with respect to the magnet part 33, its one axial end surface 37 being turned to face the one pole surface 35; preferably the end surface 37 bear against the facing pole surface 35 without any clearance therebetween.

It has turned out to be expedient for the pole part 34 to be arranged on that pole surface 35, at which the north pole N of the annular permanently magnetic magnet part 33 is located.

The magnet arrangement 27 is best generally a circularly cylinder arrangement, the magnet part 33 and the pole part 34 respectively possessing a circularly formed exterior periphery, the external diameter of both parts preferably being identical. The magnet arrangement 27 is moreover preferably arranged coaxially in relation to the housing space 2 so that its longitudinal axis coincides with the longitudinal axis 14.

From the representation on a larger scale of FIG. 3 the reader will be able to see that the lines 32 of the magnetic field produced by the magnet part 33 are deflected to one side radially outward and in this respect may be directed substantially perpendicularly to the external peripheral surface of the pole part 34. Accordingly the field lines 32 will enter the acoustic wave guide at the radially opposite point of the sensor device 16 at a relatively steep angle. The field line density is here also relatively high. On the contrary the entry of the field line section coming from the opposite pole surface 36 without a pole part is at a substantially less steep, acute angle to the longitudinal axis 17 so that generally a very intense field line array becomes established which produces a reliably detectable acoustic wave signal. The determination of position may take place extremely exactly, since the accuracy is hardly impaired by any variations in distance between the magnet arrangement and the acoustic wave guide.

Owing to the front pole part 34 there is hence the possibility of affecting the course of the field lines and adapting to needs accordingly. Possibilities of variation include for instance thickness, diameter or material selection for the pole part. It is in this manner that there is the possibility of adaptation of the magnet arrangement to suit different circumstances of the respective linear drive by making a suitable selection of the pole part, which may be produced at a relatively low price, standard parts being utilized as the magnet parts, which accordingly do not have to be customized.

Another design of the magnet arrangement 27, which also operates with certain advantages, is to be seen in FIG. 3. In the case of this further design there is additionally a second annular and permanently magnetic magnet part 33' (shown in broken lines), which is located at the axial end surface 37' axially opposite to the axial end surface 37, of the pole part 34. The pole part 34 is accordingly axially straddled on either side by one respective magnet part 33 and 33', such magnet parts preferably being so aligned that their pole surfaces having the same polarity are turned to face one another. For instance, the pole part 34 is straddled directly and on each side by north pole surfaces.

The pole part and a respective magnet part are, in the present working embodiment of the invention, respectively designed integrally. It will however be clear that it is also possible to have multi-part design, for example by having relatively thin lamellar parts sandwiched together.

Furthermore the pole parts and magnet parts utilized 34, 33 and 33' may in a particular case be non-perforated disk parts or furthermore combinations of annular and disk-like part. The preferred configuration, which could also be termed a perforated disk configuration in accordance with circumstances, possesses the further advantage in the present case of there then being a simple method of centering and support on the drive element 4.

The drive element 4 itself consists of non-magnetic material not able to be magnetized, such as aluminum or synthetic resin. Furthermore the transmission element 5 should as far as possible not be magnetizable or only slightly so. The magnet arrangement '27 is in the working embodiment completely embedded in the drive element 4 and surrounded on all sides by the same. On the one hand the magnet arrangement is accordingly well protected and on the other hand it is possible to prevent any metallic particles from the magnet arrangement finding their way to the internal peripheral surface 12, constituting the running surface for the drive element 4, and causing wear thereof.

In the present case the drive element 4 comprises two axially consecutive components or, respectively, piston parts 38 and 38', which are firmly held together. In the interior of the drive element 4 a receiving space 39 is provided, in which the magnet arrangement 27 is located, which is slipped onto an end section 40 of the transmission element 5 coaxially. In the separated condition of the two components 38 the receiving space 39 is open for assembly or dismounting the magnet arrangement 27. An attachment element 45 is screwed onto the end of the transmission element 5 and which clamps the overall arrangement of the drive element 4 against an annular shoulder 41 on the transmission element 5.

In a design wherein a magnet arrangement 27, as in the present case, has a single pole part 34, it is convenient if the latter is axially and centrally arranged in the drive element 4.

Adjacent to the join between the components 38 it is possible for a slip ring 45 to be provided on the external periphery of the drive element 4 to provide a relatively low wear fashion of cooperation with the internal peripheral surface 12.

A further advantage of the position detecting device 15 in accordance with the present working embodiment stems from the type of mounting of the rod- or bar-like sensor device 16. Measures are taken to ensure that the sensor device 16 can only be arranged with certain alignments in relation to the housing inner space 3 so that during assembly in the first place and furthermore in the case of any necessary substitution no complex adjustment operations are needed. These measures described in the following are particularly advantageous with the magnet arrangement 27 described above, although they may be employed in connection with any other designs of the magnet arrangement 27.

The above mentioned measures consist essentially in that the sensor device is not arranged on the external periphery of the housing 2, but rather in a channel-like receiving cavity 46, which is integrated in the wall 47 of the housing 2. The receiving cavity 46 is therefore within the housing wall 47 of the linear drive 1 so that a rigid, invariable association is produced with the housing space 3 containing the drive element 4 with the magnet arrangement 27. The cross sectional form of the receiving cavity 46 is adapted to that of the sensor device 16—in the present case that of the protective housing 23—so that the sensor device 16 is received in the transverse direction of the receiving cavity 46 practically without play. In order to ensure this it is simplest for the shape of the receiving space 46 and of the sensor device 16 to be made complementary to one another. If the sensor device 16 is inserted into the receiving space 46, then there will automatically be the predetermined and desired radial clearance from the magnet arrangement 27.

It will be clear that the sensor device 16 is preferably detachably inserted into the associated receiving cavity 46 in the embodiment of the invention. Accordingly the receiving cavity 46 in the embodiment is open at one end at least, the opening constituting an insertion opening 48, through which plugging in or removal of the sensor device 16 is possible. At the opposite end the receiving cavity 46 may be closed as illustrated.

In order to always ensure the same depth of insertion of the sensor device 16, preferably additional limiting means 49 are provided, in accordance with set the depth of insertion. They may for instance be constituted by a surface 50 on the housing adjacent to the opening 48 and a component surface 51 cooperating with the same, on the evaluating device 26, which is rigidly axially connected with the sensor device 16, Said surface 50 may more particularly be an end surface, opposite to the housing space 3 in the axial direction, and more especially of the associated end wall 6, as is more particularly the case in the illustrated embodiment of the invention. It is here that the insertion opening 48 on the said end surface of the terminal wall 6 is located. This terminal wall 6 is preferably the one which does not have the transmission 5 element extending through it. Accordingly even during use of the linear drive 1 safe replacement of the sensor 16 is possible, since the technician one only has to work on the rear end of the linear drive 1.

The evaluating device 26 adjoining the end of the housing 2 is preferably accommodated in a protective space 52, which for example is completely within a protective housing 53, which is mounted at the end of the housing 2, more particularly in a detachable fashion. The external shape of the protective housing 53 is preferably the same as that of the housing 2 so that the shape is uniform.

For connection with an electrical power supply or a further superposed or adjacently arranged evaluating units the protective housing 53 has an opening 54 in the wall, through which a cable 55 connected with the evaluating device 26 may be threaded. Instead of a direct cable connection it is preferably also possible to have a detachable plug-in connection. Thus for example a first conductor arrangement can be provided between the evaluating device 26 and an internal plug connection means provided on the protective housing 53, which device for its part is detachably connected with an external conductor arrangement, which may be arranged to extend to the evaluating device. Every conductor arrangement may be in the form of a flexible cable.

The housing 3 is preferably manufactured by extrusion, the receiving cavity 46 being directly formed therein during the production thereof. Preferably an aluminum extruded section is employed. It is in this manner that complex finishing operations as for example drilling, become unnecessary. Furthermore other ducts or channels required may be produced at the same time.

We claim:

1. An ultrasonic position detecting device on a linear drive for the detection of the axial position of a movably arranged drive element positioned in the housing of the linear drive, said drive element movable along a longitudinal axis extending through the housing, comprising:

a sensor device arranged fixedly in relation to the housing and radially spaced from the drive element, said sensor device having an acoustic waveguide extending in the longitudinal direction of the housing and made of a material suitable for magnetostriction and adapted to communicate with an evaluating device, and a magnet arrangement having a permanent magnet and connected with the drive element such that its magnetic field may pervade the radially adjacent acoustic waveguide, and wherein the permanent magnet of the magnet arrangement is designed in the form of an axially magnetized annular magnet part which is connected with the drive element such that its two pole surfaces are directed perpendicular to said longitudinal axis, and wherein the magnet arrangement further comprises an annular pole part arranged adjacent to one of the pole surfaces of the magnet part whereby the magnetic field passing therethrough is deflected towards said acoustic waveguide at a steep field strength gradient to facilitate the accurate detection of the axial position of the drive element.

2. The device as set forth in the preceding claim 1, wherein said magnet arrangement has a pole part straddled on either side by a respectively axially magnetized annular permanently magnetic magnet part, the two magnet parts being so arranged that pole surfaces thereof of identical polarity are turned toward each other.

3. The device as set forth in the preceding claim 1, wherein such pole part is arranged on the side of the north pole surface of a respective magnet part.

4. The device as set forth in the preceding claim 1, wherein such magnet arrangement is at least partially embedded in the drive element.

5. The device as set forth in the preceding claim 4, wherein such magnet arrangement is completely surrounded by such drive element.

6. The device as set forth in the preceding claim 5, wherein such drive element possesses two axially consecutively arranged components delimiting a receiving space accommodating said magnet arrangement.

7. The device as set forth in the preceding claim 1, wherein such annular parts of the magnet arrangement are arranged directly on one another.

8. The device as set forth in the preceding claim 1, wherein the linear drive includes a fluid power drive cylinder.

9. The device as set forth in the preceding claim 1, wherein such sensor device is arranged alongside and adjacent to the housing space accommodating the drive element and is furthermore arranged in a channel-like receiving space which extends parallel to the longitudinal axis of the housing and is integrated in a wall of the housing of the linear drive.

10. The device as set forth in the preceding claim 9, wherein such housing is in the form of an extrude component.

11. The device as set forth in the preceding claim 9, wherein such channel receiving space is open at one end at least and presents an insertion opening for the sensor device.

12. The device as set forth in the preceding claim 9, wherein such evaluating device is accommodated in a protective space axially adjoining the channel-like receiving space.

13. The device as set forth in the preceding claim 12, wherein such protective space is located at least partially in a protective housing mounted axially on the housing of the linear drive.

14. An ultrasonic position detecting device in combination with a linear drive, comprising:

a housing having an elongated space extending along a longitudinal axis therein;

a drive element disposed in said space and movable along said longitudinal axis in response to application of a fluid driving force thereto;

a sensor device arranged fixedly in relation to the housing and radially spaced from the drive element, said sensor device having an acoustic waveguide extending in the longitudinal direction of the housing and made of a material suitable for magnetostriction and adapted to communicate with an evaluating device; and a magnet arrangement having a permanent magnet and connected with the drive element such that its magnetic field may pervade the radially adjacent acoustic waveguide, and wherein the permanent magnet of the magnet arrangement is designed in the form of an axially magnetized annular magnet part which is connected with the drive element such that its two pole surfaces are directed perpendicular to said longitudinal axis, and wherein the magnet arrangement further comprises an annular pole part arranged adjacent to one of the pole surfaces of the magnet part whereby the magnetic field passing therethrough is deflected towards said acoustic waveguide at a steep field strength gradient to facilitate the accurate detection of the axial position of the drive element.

15. The device as set forth in the preceding claim 14, wherein said magnet arrangement has a pole part straddled on either side by a respectively axially magnetized annular permanently magnetic magnet part, the two magnet parts being so arranged that pole surfaces thereof of identical polarity are turned toward each other.

16. The device as set forth in the preceding claim 14, wherein such pole part is arranged on the side of the north pole surface of a respective magnet part.

17. The device as set forth in the preceding claim 14, wherein such magnet arrangement is at least partially embedded in the drive element.

18. The device as set forth in the preceding claim 17, wherein such magnet arrangement is completely surrounded by such drive element.

19. The device as set forth in the preceding claim 18, wherein such drive element possesses two axially consecutively arranged components delimiting a receiving space accommodating said magnet arrangement.

20. The device as set forth in the preceding claim 14, wherein such annular parts of the magnet arrangement are arranged directly on one another.

* * * * *